United States Patent [19]

Hudecek et al.

[11] Patent Number: 4,584,354
[45] Date of Patent: Apr. 22, 1986

[54] GRAFT COPOLYMERS AND THE METHOD OF THEIR PREPARATION

[75] Inventors: Slavko Hudecek; Ivana Hudĕckova; Pavel Cefelin, all of Prague, Czechoslovakia

[73] Assignee: Ceskoslovenska Akademie Ved of Prague, Praha, Czechoslovakia

[21] Appl. No.: 662,249

[22] Filed: Oct. 18, 1984

Related U.S. Application Data

[63] Continuation-in-part of Ser. No. 366,570, Apr. 8, 1982, abandoned.

[30] Foreign Application Priority Data

Apr. 17, 1981 [CS] Czechoslovakia .................. 2942-81

[51] Int. Cl.$^4$ .................. C08F 283/04; C08F 265/10
[52] U.S. Cl. .................. 525/454; 525/455; 525/296
[58] Field of Search .................. 525/454, 455, 296

[56] References Cited

U.S. PATENT DOCUMENTS

Re. 29,772  9/1978  Niederhauser et al. ............ 525/440
3,297,745   1/1967  Fekete et al. ..................... 525/455

Primary Examiner—John C. Bleutge
Assistant Examiner—A. L. Carrillo
Attorney, Agent, or Firm—Murray Schaffer

[57] ABSTRACT

Graft copolymers are formed having a backbone formed by monomeric units, selected from the group of vinyl monomers comprising acrylates, methacrylates, acrylamide, styrene and N-vinyl-2-phyrrolidone, and side branches formed by 10–80 wt. % of oligourethanes based on aliphatic, aromatic and alkylaromatic diisocyanates and low-molecular-weight diols with 2–4 carbon atoms in the molecule. The graft copolymers are prepared in two steps: the first step consists in the synthesis of oligourethane with the terminal unsaturated group; the second step is the radical copolymerization of this oligourethane with the above vinyl monomers.

4 Claims, No Drawings

GRAFT COPOLYMERS AND THE METHOD OF THEIR PREPARATION

RELATED APPLICATION

This is a continuation-in-part application of now abandoned U.S. Ser. No. 366,570 filed Apr. 8, 1982.

BACKGROUND OF THE INVENTION

The present invention pertains to rigid urethane-diol oligomer copolymers and the method of their preparation.

Graft copolymers are understood as the type of high-molecular-weight compounds, which have a main chain, i.e., backbone, chemically different from its side chains, i.e., branches, (Bruno Volmers, Polymer Chemistry (English translation) Springer Verlag, N.Y. 1973, pp. 288-300).

It is known that graft copolymers may be prepared by various methods which have a common fundamental feature, e.g., the basic polymer is always a starting material and the side chains are created on it either by polymerization of another monomer or by direct coupling. One of the often used methods of grafting by polymerization is the so called chain transfer where the basic polymer is dissolved in monomer, e.g., polyacrylate in styrene, and a suitable initiator is added which initiates the polymerization. In such case, the resulting composition or product (a mixture of graft copolymer and homopolymer) depends on the transfer constant. Because this constant is usually very low (about 10-5), the yield of copolymer is relatively low. However, such cases occur where the transfer constant is high due to the presence of relatively labile H-atoms in the vicinity of a double bond, e.g., with polybutadiene and its derivatives.

The polymerization of the main chain may be also started with X-rays, $\gamma$-rays, etc., where a polymer radical is formed which is able to initiate the polymerization of the monomer present.

If the polymer molecule contains double bonds, it can be employed for the copolymerization of radical type, as it is, for example, with the gelation of unsaturated polyesters by copolymerization with styrene. Such tetrafunctional compounds (i.e. having two terminal ethylenically unsaturated groups) lead to a polymer having "a covalent chemical network" meaning a polymer which is covalently crosslinked, remaining always crosslinked and forever non-reversible.

Another known method is the introduction of functional groups into the basic polymer, e.g., peroxo, azo, $CO_2H$, OH,

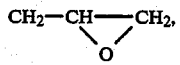

NCO, COCl, COOCO, or $CH_2O$ groups, which then take part in the reaction either with a monomer or with an oligomer containing a suitable operating terminal group.

The present invention pertains to the formation of rigid urethane-diol oligomer grafted copolymers, wherein the basic polymer chain is formed by monomer units selected from the group comprising acrylates, methacrylates, acrylamide, styrene and N-vinyl-2-pyrrolidone, and the side branches are formed by 10-80 weight percent of oligourethanes based on aliphatic, aromatic and alkylaromatic diisocyanates and aliphatic low-molecule-weight diols containing 2-4 carbon atoms.

The method for preparation of the grafted copolymers according to the invention consists in the synthesis of oligourethane in the first step, which is copolymerized by radical mechanism with the low-molecular-weight vinyl monomers, selected from the group comprising acrylates, methacrylates, acrylamide, styrene, and N-vinyl-2 pyrrolidone, in the second step.

It has been found that the grafted copolymer, with the basic chain created by polymerization of vinyl monomer units and with oligourethanes as side branches, may be prepared in such a way, that an oligourethane based on aliphatiic, aromatic, and alkylaromatic diisocyanates and low-molecular-weight diols with 2-4 carbon atoms and a terminal unsaturated group, is synthesized in the first step, and then, in the second step, is subjected to the radical copolymerization with the low-molecular-weight monomer selected from the group comprising acrylates, methacrylates, acrylamide, styrene and N-vinyl-2-pyrrolidone. The terminal unsaturate double bond is introduced into the molecule of oligourethane in the first reaction step by the presence of 0.03 to 0.25 mol of hydroxyalkyl acrylate or hydroxyalkyl methacrylate, as 2-hydroxy-ethyl acrylate, 5-hydroxy-3-oxapentyl acrylate, 8-hydroxy-3,6-dioxaoctyl acrylate, 2-hydroxyethyl methacrylate, 5-hydroxy-3-oxapentyl methacrylate, and 8-hydroxy-3,6-dioxaoctyl methacrylate, calculated on 1 mol of diisocyanate used.

As follows from published data, the reaction of 2-hydroxy-ethyl methacrylate with dissocyanate led, however, to the corresponding diurethane, i.e. from the standpoint of radical polymerization, to the tetrafunctional monomer which acted as a crosslinking agent in copolymerization (S. S. Labana: J. Polymer Sci., A-1 6, 3283 (1968). The synthesis of tetrafunctional compound is similarly described by Yu. L. Spirin, V. V. Magdinets, A. F. Maslyuk, L. N. Vilenskaya and A. R. Rudko in the Soviet Union Pat. No. 273,424 (1970).

We have found that the formation of diurethane depends on the molar ratio of hydroxyalkyl acrylate or methacrylate to diisocyanate and that the limit of the molar ratio, below which diurethane is formed only in traces in addition to monourethane, is 0.25 mol to 1 mol of diisocyanate. A suitable aliphatic diisocyanate is hexamethylenediisocyanate, suitable aromatic diisocyanates are p-phenylenediisocyanates, 2,4-tolylenediisocyanate, 2,6-tolylenediisocyanate (or their mixture), m-xylylenediisocyanate, 1,5-naphthalenediisocyanate, suitable alkylaromatic diisocyanates are 4,4'-methylenebis-(phenylisocyanate) and 4,4'-ethylenebis(phenylisocyanate). The bifunctional oligourethane is formed by polyaddition reaction in the presence of low-molecular-weight diols, as ethylene glycol, propylene glycol, 1,4-butanediol, and 3-oxa-1,5-pentandiol.

Oligourethane having a vinyl group may be prepared stepwise, i.e. diisocyanate is allowed to react with hydroxy-alkyl acrylate or methacrylate first and on completion of that reaction with a corresponding diol. The reaction may be also carried out in one step, when both hydroxy compounds, the monohydroxy and dihydroxy, react with diisocyanate at the same time. Both in the first and in the second case, hydroxyalkyl ester acts as a terminator and, consequently, the molecular weight of the resulting oligourethane depends on the molar ratio of hydroxy ester to diisocyanate (in addition to the degree of conversion), as illustrates Table I.

| Example no. | mol HEMA | $\overline{M}_n$ | $x_E$ |
|---|---|---|---|
| 1 | 0.25 | 1160 | 20.7 |
| 2 | 0.20 | 1560 | 15.3 |
| 3 | 0.15 | 2040 | 11.9 |
| 4 | 0.10 | 2280 | 10.7 |
| 5 | 0.05 | 3600 | 6.9 |

$x_E$ - mol % of double bonds in oligourethane.

The product may be isolated, on completion of the reaction, by precipitation into water, filtration and drying to constant weight and used for copolymerization. The reaction product can be used without isolation, if the concentration of OH-groups was chosen higher than an equivalent, with respect to the concentration of NCO-groups. In such case, oligourethane is terminated with the hydroxyl groups as shows the formula of assumed structure:

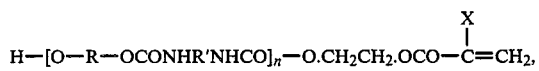

$$H-[O-R-OCONHR'NHCO]_n-O.CH_2CH_2.OCO-\underset{|}{\overset{X}{C}}=CH_2,$$

where
R belongs to the used diol
R' belongs to the used diisocyanate
X is H or $CH_3$.

It has been proven, that oligourethane prepared in this way is able to copolymerize with low-molecular-weight vinyl monomers selected from the group comprising acrylates, methacrylates, acrylamide, styrene and N-vinyl-2-pyrrolidone, thus forming the grafted copolymers which have the basic chain formed by constitutional structural units of the above monomers and the branches formed from oligourethanes. These copolymers are meltable and soluble under certain conditions. The conditions are given by both the chemical structure of main chain and the chemical structure of the branches.

As will be seen from the foregoing, the grafted polymer produced in accord with the present invention has a structure providing crystallinic rigid microareas serving as a physical network which enables the transition of the material into a non-crosslinked composition by simple heat treatment.

According to the present invention when the ratio of the hydroxyalkyl acrylate or methacrylate to the oligourethane is held in the range of 0.03 to 0.25 mol of hydroxyalkyl acrylate or methacrylate to 1 mol of diisocyanate, compounds with only one terminal ethylenic unsaturation are formed. When copolymerizing the compounds of the invention, copolymers are formed which have only a physical network, contrary to the chemically covalently cross-linked copolymers discussed earlier. The compounds of the present invention are reversible due to the microheterogeneous structure which is formed in consequence to the fact that the individual components are mutually immiscible. This physical network can be destroyed by heating the system to a temperature above the melting point of the polyurethane component and can be formed again when cooling the system.

The resulting copolymers combine the physical and mechanical properties of their components, similarly as it is in block copolymers of the ABA or (AB) n type (so called segmented copolymers), according to the content of individual components.

These properties enable a broad application of graft copolymers according to the invention. The combination of a hydrophilic and lipophilic components leads, for example, to a product having the character of non-ionogenic emulsifiers for the system water—organic phase; connection of a component with the tendency to crystallization with the basic elastomeric chain gives products of enhanced elasticity modulus.

The advantage of preparation of graft copolymers according to the invention consists in the easy method of preparation on the one hand and in connection of entirely different types of macromolecular compounds on the other.

According to our invention the synthesis must be carried out in the presence of an aprotic solvent such as dimethylformamide (DMF) or dimethylsulfoxide (DMS) from which the oligomer is isolated per se and then reacted with the appropriate monomer such as acrylate, methacrylate, acrylamide, styrene, N-vinyl-pyrrolidon.

The reaction takes place in the following way. First the diisocyanate is reacted with HEMA and the formed product with the diol thus forming the oligomer having only one terminal ethylenically unsaturated group, which is afterwards copolymerized with the above monomers. Due to the presence of only one unsaturated group there is formed a copolymer which is not cross-linked but has only a physical network which is dry, rigid, highly disposed to crystallization, and not elastic, but which is reversible due to the microheterogeneous structure which is formed in consequence to the fact that the crystallinic phase and the amorphous phase are mutually immiscible, which network can be in contradistinction to the covalent crosslinking, destroyed by heating and renewed by cooling the system.

The invention is further illustrated in several examples of performance wihout, however, limiting its scope by any means.

EXAMPLE 1

A three-necked flask, furnished with a stirrer, an inlet of dried nitrogen and a protecting seal against air moisture, was flushed with nitrogen and charged with 5.6 g of hexamethylenediisocyanate, 1.08 g of 2-hydroxyethyl methacrylate (mol. ratio 1:0.25), and 0.1 ml tetrabutyltin under vigorous agitation. Temperature of the reaction mixture was kept at 50° C. for 1 hour under an inert atmosphere. Then, 20 ml of dimethylformamide was added to the reaction mixture and, after one minute, a solution of 3.0 g of 1,4-butanediol and 0.2 ml of tetrabutyltin in 20 ml DMF was then added. Temperature 50 degrees C. was maintained for further 5 hours.

The formed suspension was poured into 800 ml of distilled water under stirring and allowed to stand overnight. The precipitate was filtered on a glass filter and dried in vacuum over $P_2O_5$ to a constant weight.

EXAMPLE 2

The initial amount of 0.87 g of 2-hydroxyethyl methacrylate (mol. ratio 1:0.20) was used in the preparation of oligomer by the same procedure as in Example 1.

EXAMPLE 3

Analogously as described in Example 1, oligourethane was prepared with 0.65 g of 2-hydroxyethyl methacrylate (HEMA) (mol. ratio 1:0.15).

EXAMPLE 4

The procedure given in Example 1 was used for preparation of the oligomer from 0.43 g HEMA (mol. ratio 1:0.10).

EXAMPLE 5

The initial amount of HEMA was 0.22 g (mol. ratio 1:0.05); the procedure was the same as in Example 1.

EXAMPLE 6

The same apparatus as in Example 1 was flushed with nitrogen and used for dissolution of 2.6 g oligourethane, prepared according to Example 1, in 20 ml hot DMF (about 70° C.). Then, 2.6 g HEMA was added which contained 0.026 g of dissolved 2,2'-azobis(isobutyronitrile). The reaction mixture was heated to 70° C. under continuous stirring for 4 hours.

The resulting pasty product was diluted with 250 ml of aqueous alcohol (40 wt.% H$_2$O) and allowed to stand overnight. The powder-like precipitate was washed on filter with further aqueous ethanol and dried to constant weight. The composition of copolymer was determined from the elemental analysis: 60% of oligourethane, 40% HEMA.

EXAMPLE 7

The same apparatus as in the Example 1 was flushed with nitrogen and charged with 1.62 g of oligomer from Example 1, which was dissolved in 15 ml DMF, and 5.25 g of acrylamide and 0.053 g dibenzoyl peroxide, dissolved in 15 ml DMF. The solution was heated to 80° C. for 5 hours and then poured into 500 ml acetone under stirring. The isolated and dried copolymer (the yield 6.75 g) contained 68 wt.% of acrylamide units.

EXAMPLE 8

Oligourethane (2.0 g), prepared according to Example 2, was dissolved in 14 ml DMF and the solution of 4.0 g N-vinyl-2-pyrrolidone in 10 ml DMF, containing 0.04 g of 2,2'-azobis(isobutyronitrile), was added. The mixture was heated to 80° C. in an inert atmosphere for 5 hours and then poured into 500 ml of diethylether.

The dry product (the yield 4.79 g) contained 77% poly(N-vinyl-2-pyrrolidone) and 23% oligourethane.

EXAMPLE 9

Oligourethane (2.0 g) according to Example 5 was dissolved in 24 ml DMF and subjected to copolymerization with 4.0 g of ethyl acrylate in the presence of 0.04 g of 2,2'-azobis(isobutyronitrile) at 80° C. for 6 hours. The copolymer was isolated by precipitation into amylalcohol (600 ml) and contained 55 wt.% of poly(ethyl acrylate) and 45 wt.% of oligourethane.

EXAMPLE 10

In an Erlenmayer flask of volume 50 ml, 5.6 g of hexamethylenediisocyanate was mixed with 0.65 g HEMA (mol. ratio 1:0,15), stoppered and kept at laboratory temperature for 24 hours. The product was then dissolved in 20 ml DMF and placed in a three-necked flask furnished with a stirrer, an inlet of dry nitrogen, and a seal against air moisture. The solution was heated to 50° C. and 3.53 g of diethylene glycol in 20 ml DMF and 0.2 ml tetrabutyltin was added. The reaction mixture was kept at this temperature for 8 hours. The solution was then poured into 800 ml of distilled water and allowed to stand overnight.

The dry product contained according to NMR spectra 14.6 mol % of terminal double bonds, which corresponded to $\overline{M}_n$ 1730.

EXAMPLE 11

The freshly distilled 4,4'-methylenebis(phenylisocyanate) (8.33 g) was dissolved in 30 ml DMF in the apparatus according to Example 1, 0.86 g HEMA (2-hydroxyethyl methakrylate) was added, and the mixture was heated to 50° C. under stirring and kept at this temperature for one hour. Butanediol (3 g) dissolved in 5 ml DMF was then added and the mixture was heated to 70° C. for further 8 hours.

Then, 15.0 g HEMA together with 0.15 g of 2,2'-azobis(isobutyronitrile) were added and heating and stirring were continued for another 4 hours.

The resulting viscous solution was poured into 500 ml aqueous ethanol (40 wt.% H$_2$O) under vigorous stirring and the precipitate was isolated by filtration and dried on the following day. The yield was 23.31 g of copolymer which contained 64% of poly(2-hydroxyethyl methacrylate) and 36% of oligourethane.

EXAMPLE 12

In the apparatus according to Example 1 5.6 g hexamethyldiisocyanate and 0.65 g HEMA (mol. ratio 1:0.15) with 0.1 ml tetrabutyltin were placed and kept at 50 degrees C. under nitrogene atmosphere for 2 hours. Then, 40 ml DMS with 1.5 g 1,4-butanediol, 1.76 g diethyleneglycol and 0.2 ml tetrabutyltin were added. Heating and stirring were continued for another 6 hours.

The reaction mixture was poured into 800 ml of distilled water under stirring and allowed to stand overnight. The precipitate was dried in vacuum to a constant weight.

EXAMPLE 13

Oligourethane (2.0 g) prepared according to Example 12, was dissolved in N-methyl-2-pyrrolidone (15 ml) and the solution of N-vinylpyrrolidone (4.0 g) in N-methyl-2-pyrrolidone (10 ml) containing 0.04 g 2,2'-azobis(isobutyronitrile) was added. The mixture was heated to 60° C. in nitrogene atmosphere for 8 hours then poured into 500 ml of diethylether.

The dry product (the yield 4.20 g) contained 81 wt.% poly(N-vinyl-2-pyrrolidone) and 19% oligourethane.

What is claimed:

1. Grafted copolymers, comprising a basic polymer chain formed by monomer units selected from the group consisting of acrylates, methacrylates, acrylamide, styrene and N-vinyl-2-pyrrolidone, and side branches formed by 10–80 weight percent by oligourethanes based on aliphatic, aromatic and alkylaromatic diisocyanate and aliphatic low-molecular-weight diols having 2–4 carbon atoms in the molecule, said side branches and said basic polymer chain being linked through a single terminal ethylenic unsaturated bond introduced into said side branches through the reaction of 0.03–0.25 mol of hydroxyalkyl acrylate or methacrylate with each mol diisocyanate in the presence of an aprotic solvent, said copolymer having a physical network comprising rigid crystalline urethane-diol microdomains capable of being reversibly broken down by heating and reformed by cooling.

2. The grafted copolymer according to claim 1 wherein said aprotic solvent is dimethylformamide or dimethylsulfoxide.

3. A method for the preparation of the grafted copolymers according to claim 1, comprising the steps of first synthesizing a oligourethane having one terminal unsaturated group and, in a second step, copolymerizing said synthesized oligourethane by radical mechanism with low-molecular-weight vinyl monomers selected from the group consisting of acrylates, methacrylates, acrylamide, styrene and N-vinyl-2-pyrrolidone, said terminal unsaturated group being introduced into said oligourethane through the reaction of 0.03–0.25 mol of hydroxyalkyl acrylate or methacrylate with each mol of diisocyanante in the presence of an aprotic solvent.

4. The grafted copolymer according to claim 3 wherein said aprotic solvent is dimethylformamide or dimethylsulfoxide.

* * * * *